(12) United States Patent
Benedix et al.

(10) Patent No.: US 7,127,553 B2
(45) Date of Patent: Oct. 24, 2006

(54) METHOD FOR DETERMINING THE OPTIMUM ACCESS STRATEGY

(75) Inventors: Alexander Benedix, München (DE); Georg Braun, Holzkirchen (DE); Bernd Klehn, Unterhaching (DE)

(73) Assignee: Infineon Technologies AG, Munich (DE)

( * ) Notice: Subject to any disclaimer, the term of this patent is extended or adjusted under 35 U.S.C. 154(b) by 296 days.

(21) Appl. No.: 10/717,337

(22) Filed: Nov. 19, 2003

(65) Prior Publication Data

US 2004/0117800 A1 Jun. 17, 2004

Related U.S. Application Data

(63) Continuation of application No. PCT/DE02/01715, filed on May 13, 2002.

(30) Foreign Application Priority Data

May 21, 2001 (DE) ................................ 101 24 767

(51) Int. Cl.
*H01L 27/108* (2006.01)
(52) U.S. Cl. ....................... 711/105; 711/106; 711/170; 365/203; 365/222
(58) Field of Classification Search ................. 711/105
See application file for complete search history.

(56) References Cited

U.S. PATENT DOCUMENTS

| | | | |
|---|---|---|---|
| 4,195,342 A * | 3/1980 | Joyce et al. ................. | 711/118 |
| 5,452,440 A * | 9/1995 | Salsburg ..................... | 711/136 |
| 5,699,543 A | 12/1997 | Saxena | |
| 5,819,082 A | 10/1998 | Marion | |
| 6,052,134 A | 4/2000 | Foster | |
| 6,085,290 A | 7/2000 | Smith et al. | |
| 6,343,324 B1 * | 1/2002 | Hubis et al. ................. | 709/229 |

FOREIGN PATENT DOCUMENTS

| | | |
|---|---|---|
| EP | 0 917 057 | 5/1999 |
| TW | 368635 | 9/1999 |
| TW | 434479 | 5/2001 |
| WO | 00/45259 | 8/2000 |
| WO | 00/67124 | 11/2000 |

OTHER PUBLICATIONS

Mekhiel et al., "Performance analysis for a cache system with different DRAM designs", 1993, IEEE CCECE/CCGEI '93, pp. 365-368.*
MoSys Incorporated: "Application Note—Memory Controller Design—Using MoSys High-Speed SGRAM", AN-SG01 Rev. 1.4—Sep. 1, 1998, Sunnyvale, CA, pp. 1-14.
Akatsu Motoyasu, et al.: "Parallel Processing (Parallel OLTP, Parallel Batch, Parallel SQL)", NEC Technology Journal, No. 48, 9th issue, Sep. 25, 1995, pp. 90-97 and partial English translation thereof.

* cited by examiner

*Primary Examiner*—Donald Sparks
*Assistant Examiner*—Sam Dillon
(74) *Attorney, Agent, or Firm*—Laurence A. Greenberg; Werner H. Stemer; Ralph E. Locher

(57) ABSTRACT

A configuration for executing data processing processes has an operating system and various system resources that are accessed by the operating system using an access strategy for the execution of system processes. When there are different applications, different access strategies to the system resources are used. A method is also provided for determining the optimum access strategy to the system resources.

4 Claims, 1 Drawing Sheet

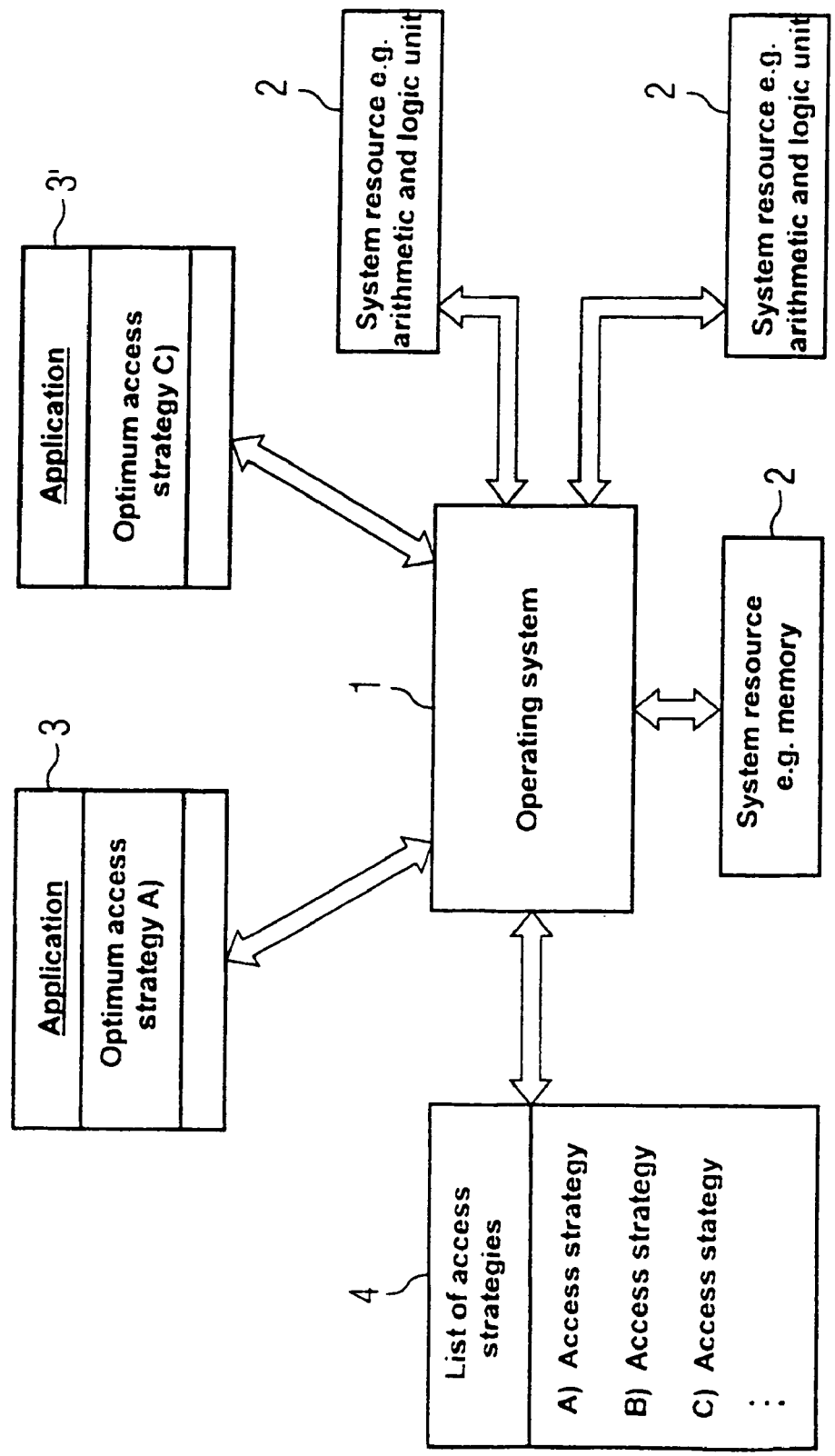

METHOD FOR DETERMINING THE OPTIMUM ACCESS STRATEGY

CROSS-REFERENCE TO RELATED APPLICATION

This application is a continuation of copending International Application No. PCT/DE02/01715, filed May 13, 2002, which designated the United States and was not published in English.

BACKGROUND OF THE INVENTION

Field of the Invention

The invention relates to a method for determining the optimum access strategy in a configuration for processing data processing processes where an operating system allows one or a plurality of system resources to process system processes when an application is carried out.

The efficiency or speed of applications depends in some cases to a great extent on how existing system resources of a system are addressed. For example, there are programs with which it is appropriate to leave the banks of the main memory, namely a DRAM (Dynamic Random Access Memory) open after the first access. Other programs in turn are then particularly fast if the banks of the DRAMs are closed again immediately after the first access.

An optimum access strategy to the main memory cannot be defined for all applications and all conceivable systems. Nevertheless, it is desirable to use the respective optimum access strategy for each combination of a system and an application.

Hitherto, the access strategy was defined, for example, on the main memory in the chip set of a system (PC, workstation), by hardware. The access strategy that is defined in terms of hardware has the disadvantage that it is preset and cannot be adapted to the respective application.

Difference access strategies are known from U.S. Pat. No. 6,052,134, which teaches that an access strategy can be adjusted independent of the respective application.

However, it is still very difficult and costly for a user to determine the optimal access strategy.

SUMMARY OF THE INVENTION

It is accordingly an object of the invention to provide a method for determining an optimum access strategy in a configuration for processing data processing processes, which overcomes the above-mentioned disadvantages of the prior art methods of this general type.

In particular, it is an object of the invention to provide a method for determining the optimum access strategy in dependence on the system and the application.

This object is achieved in that:
a) a system process,
b) on a system resource,
c) is executed with various access strategies,
d) each access strategy is assigned a value which corresponds to the execution speed of the application, and
e) after testing all of the access strategies, the access strategy with the best value is defined as the standard strategy.

By implementing a multiplicity of access strategies, it is possible to select in each case the optimum access strategy for each application.

With the foregoing and other objects in view there is provided, in accordance with the invention a method for determining an optimum access strategy in a configuration for processing data processing processes. The method includes the following steps: The configuration for processing data processing processes is provided with an operating system allowing at least one system resource to process system processes when an application is carried out. With the system resource, different access strategies are used to process an application or a system process. After testing all of the access strategies, a value corresponding to an execution speed of the application or the system processor is assigned to each of the access strategies. The value is stored.

The determination of the optimum access strategy is preferably carried out for a specific application only on specific occasions, specifically if the user is willing to accept the time that it will take to determine the optimum access strategy. This is particularly the case if the user installs a new application and must in any case spend time on it, or if the user installs a new piece of hardware and wishes to optimize the already existing software for the new hardware, or if new improved access strategies are to be made available for the system.

The definition of the optimum access strategy can be made not only in simple systems with just one processor, but also in more complex systems with a multiplicity of system resources.

In relatively complex systems having a plurality of system resources for each system resource, the optimum access strategy is preferably determined and defined for each application.

The invention will be explained in more detail below with reference to an exemplary embodiment illustrated in the drawings.

Other features which are considered as characteristic for the invention are set forth in the appended claims.

Although the invention is illustrated and described herein as embodied in a method for determining the optimum access strategy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The drawing FIGURE is a basic view of a configuration for executing data processing processes.

DESCRIPTION OF THE PREFERRED EMBODIMENTS

Referring now to the figures of the drawing in detail and first, particularly, to FIG. 1 thereof, there is shown a basic view of a configuration for executing data processing processes. Such a configuration is generally used in a PC or a workstation. An operating system 1 is installed on each PC or each workstation. The operating system 1 accesses what are referred to as system resources 2 in order to execute system processes, and the system resources 2 take over the execution of the system processes.

A system resource 2 is, for example, the processor or the main memory, for example a DRAM (Dynamic Random Access Memory) or an arithmetic and logic unit such as an integer or floating point unit arithmetic and logic unit or, for example, a graphics card or the processor on the graphics card.

If an application program or an application 3 or 3' is then made to run on the PC or the workstation, the execution speed of the application 3 or 3' depends to a great extent on which access strategy A, B, C, . . . has been selected for the system resources 2.

There are, for example, applications with which it is appropriate to leave the banks of the main memory open after the first access. Other programs are in turn then particularly fast if the banks of the DRAMs are closed again directly after the first access.

According to the invention, the operating system 1 is therefore connected to a list 4 of access strategies A, B, C, . . . , which can each be used to access the individual system resources 2 during the execution of an application 3, 3'.

During the determination of the optimum access strategy for an application, all of the available access strategies are tested on the system resources. A test run of the application is carried out for each access strategy. After each test run, a value that corresponds to the execution speed of the application is stored.

After all the access strategies have been carried out and tested, the strategy that had the best performance value is stored as the standard strategy for the tested application. The application is carried out with the respective strategy starting from this time.

There are two alternatives for selecting the access strategy. Either the entire application is carried out with a single access strategy for all of the system resources and the one which supplies the best result with all the system resources in combination is used, or the procedure is carried out for each system resource and the optimum access strategy for the corresponding application is determined for each system resource.

The optimum access strategy is determined for certain applications only on certain occasions, specifically if the user is willing to accept the time that it will take to determine the optimum strategy.

This is generally the case when a new piece of hardware is installed or a new piece of software or else new access strategies for the system are installed.

The method described above for determining the optimum access strategy for an application has the advantage that this method can be applied to simple systems (single processor systems) as well as on multiprocessor systems or multi-resource systems.

A further advantage of this method is that it can be carried out by the user only on defined occasions and thus does not take up any system resources during the normal running time.

We claim:

1. A method for determining an optimum access strategy in a configuration for data processing, the method which comprises:

providing the configuration for data processing with an operating system allowing system processes to be executed with at least one system resource when an application is carried out, the system resource being a main memory;

using different access strategies with the system resource to carry out an application or execute a system process, whereby an access strategy consists of either leaving open banks of the main memory after a first access or closing the banks of the main memory after the first access;

after testing all of the access strategies, assigning a value corresponding to an execution speed of the application or the system processor to each of the access strategies; and storing the value.

2. The method according to claim 1, which further comprises: enabling a user of the system to determine an optimum access strategy at any time.

3. The method according to claim 1, which further comprises;

providing a plurality of system resources; and determining an optimum access strategy for each individual one of the plurality of system resources.

4. The method according to claim 1, which further comprises:

providing a plurality of system resources; and for an application, determining a uniform optimum access strategy for all of the plurality of system resources.

* * * * *